UNITED STATES PATENT OFFICE.

JOHN LUCAS, OF GIBBSBOROUGH, NEW JERSEY, ASSIGNOR TO HIMSELF AND WILLIAM HENRY LUCAS, OF PHILADELPHIA, PENNSYLVANIA.

IMPROVEMENT IN PAINTS.

Specification forming part of Letters Patent No. 141,802, dated August 12, 1873; application filed November 29, 1872.

*To all whom it may concern:*

Be it known that I, JOHN LUCAS, of Gibbsborough, Camden county, State of New Jersey, have invented an Improvement in Mixed Paints or Colors, of which the following is a specification:

My invention consists of a liquid composition or vehicle to be used in the preparation of paints, the vehicle being composed of linseed-oil, copal or other gum, and calcined acetate of lead.

It is essential in carrying out my invention that the vehicle be so prepared as not to destroy the elastic property of the linseed-oil, which is principally relied on to prevent the paint from cracking. For this reason the linseed-oil is slowly heated at a temperature not greater than 212°, until all the moisture is driven off. The elastic properties of the oil, which are impaired by boiling it, are thus preserved. While the oil is still hot the gum is added, the calcined acetate of lead being then slowly introduced.

Various proportions of the materials may be used, but I prefer to employ six pounds of gum and two pounds of acetate of lead with each hundred gallons of oil. The zinc-white, earth-paint, or other pigment is added to the above composition, and the mixture is ground and thinned in any suitable manner.

I claim—

A paint vehicle consisting of linseed-oil, heated as set forth, combined with gum and acetate of lead.

In testimony whereof I have signed my name to this specification in the presence of two subscribing witnesses.

JOHN LUCAS.

Witnesses:
 WM. A. STEEL,
 JOHN K. RUPERTUS.